United States Patent [19]

Will

[11] Patent Number: 4,929,477
[45] Date of Patent: May 29, 1990

[54] HEAT-SHRINKABLE SLEEVE AND THE PROCESS FOR THE PRODUCTION THEREOF

[75] Inventor: Horst Will, Hagen, Fed. Rep. of Germany

[73] Assignee: Firma RXS Schrumpftechnik-Garnituren GmbH, Fed. Rep. of Germany

[21] Appl. No.: 216,513

[22] Filed: Jul. 8, 1988

[30] Foreign Application Priority Data

Jul. 15, 1987 [DE] Fed. Rep. of Germany ....... 3723396

[51] Int. Cl.$^5$ .............................................. B27N 5/02
[52] U.S. Cl. .................... 428/34.9; 428/192; 428/194; 428/195; 428/198; 428/200; 428/343; 428/346; 428/247; 428/255; 428/913; 174/DIG. 8; 156/86; 156/272.2; 264/342 R
[58] Field of Search .............. 428/34.9, 198, 247, 428/255, 192, 194, 195, 200, 343, 346, 913; 174/DIG. 8; 156/86, 272.2; 264/342 R

[56] References Cited

U.S. PATENT DOCUMENTS 4,631,098 12/1986 Pithouse et al. ................. 428/34.9
4,639,546 1/1987 Meltsch ....................... 174/DIG. 8

FOREIGN PATENT DOCUMENTS 0117026 8/1984 European Pat. Off. .
1497051 1/1978 United Kingdom .

Primary Examiner—Ellis P. Robinson
Assistant Examiner—P. J. Ryan
Attorney, Agent, or Firm—Hill, Van Santen, Steadman & Simpson

[57] ABSTRACT

A heat-shrinkable sleeve which has a shrinkable component and comprises a cross-linked polymer in the form of an open grid, said shrinkable component being embedded into a non-shrinkable component. The individual elements forming the open grid create a plurality of grid cells and are undetachably connected to one another at the point of intersection of the elements.

24 Claims, 1 Drawing Sheet

HEAT-SHRINKABLE SLEEVE AND THE PROCESS FOR THE PRODUCTION THEREOF

BACKGROUND OF THE INVENTION

The present invention is directed to a heat-shrinkable sleeve having a shrinkable component which is arranged with a non-shrinkable component.

Shrinkable fabrics are described, for example, in European Patent Application No. 0,117,026. As disclosed, shrinkable fabrics are used which are embedded in a non-shrinkable material. In order to achieve a higher mechanical stability in addition to the shrinkable fabric fibers, non-shrinkable heat-resistant fibers, for example glass fibers, are additionally embedded. Such additional, non-shrinkable elements are not very compatible, however, with the synthetic materials used so that, for example, cavities can form or water can be incorporated by capillary action along these embedded fibers. On the other hand, the fabric structure of this reinforcing foil is not absolutely resistant to tearing or the growth of the tearing in the case of unsuitable treatment.

SUMMARY OF THE INVENTION

The object of the present invention is to provide a heat-shrinkable sleeve in which the individual components are compatible to one another and are, thus, fixed in respect to mutual adhesion and resulting stability in such a manner that the danger of tearing or the growth of tearing is largely eliminated.

In order to achieve these objects, the present invention is directed to a heat-shrinkable sleeve comprising a shrinkable component which is arranged with a non-shrinkable component, with the improvements comprising the shrinkable component consisting of a cross-linked polymer having the form of an open grid with the strands forming the grid being undetachably connected at each point of intersection, said grid being stretched and being embedded in a non-shrinkable component of the sleeve.

Another object of the present invention is a method of manufacturing the heat-shrinkable sleeve, which has a shrinkable component composed of an open grid with the points of intersection of the elements of the grid being undetachably connected to one another and the grid being embedded in a non-shrinkable component, wherein the shrinkable component formed by the grid is embedded into the non-shrinkable component and then the entire combination of the shrinkable component and non-shrinkable component are stretched the desired amount. A second modification of the process comprises, first, stretching the shrinkable component in the form of a grid and then embedding it in the non-shrinkable component.

In comparison to the prior art, the heat-shrinkable sleeve corresponding to the invention results in considerable improvements and advantages with respect to the tearing resistance, the tear growth resistance, the elasticity and flexibility, as well as stability of the general kind. For example, in addition to the cold impact strength, the resistance to oil and solvents and wear resistance are also improved in a sleeve of this kind.

These characteristics result on the one hand from the appropriate selection of the materials and, on the other hand, from the formation of the shrinking component in the form of a stable, lattice structure.

Thus, for example, a thermo-plastic non-irradiation-cross-linkable polyether-ester-elastomer is used as the main component of the compound for the non-shrinkable component of the sleeve. In addition, other materials, which are not determinative in this context, can also be incorporated. Thus, for example, the main component of the compound can also be mixed with compatible synthetic resins, for example ethylene-vinylacetate, in different constituent quantities, or an irradiation-cross-linkable components, whereby the thermal resistance is set in accordance with these requirements For a further, additional mechanical reinforcement, additional elements in the form of reinforcing fibers can be incorporated which, likewise, consists, in accordance with the invention, of materials which are compatible with the main component, for example which are of a similar chemical composition to the main component itself. However, these materials have a crystallite melting point which is higher than that of the main component, for example above 200° C. This insures that these additional reinforcing elements are thermally stable in relation to the main component and, thus, retain their shape at the shrinking temperature. By way of contrast, the non-shrinking component softens without running at the shrinking temperature so that the change in shape, which is to be achieved by means of the shrinkage, is possible. Such materials can be selected from a group consisting of polyethylene, polybutene, polyamide 6, and poly-4-methyl-pentene 1. The addition of such materials amounts to between 10 and 60 volume percent, depending upon the required additional stability.

Fully compatible materials, for example irradiation-cross-linked polyethylene, are likewise used for the shrinkable components in accordance with the present invention.

In accordance with the invention, the shrinkable component is in the form of a lattice or open grid. This grid or reticle can consist of already shrinkable fiber elements or of a shrinkable lattice structure where the individual fibers, strands or lattice elements of the grid or reticle cells are undetachably connected to one another at the corner points or intersection points. Thus, an already shrinkable component of this kind is also already stretched so that it has already been provided with the shape memory for the shrinkage. This shrinkable component is either directly embedded into the non-shrinkable component or, first, inserted between two foils consisting of non-cross-linked polyethylene and, thus, introduced in the form of a laminate into the non-shrinkable component. Following assembly, both variants can, thus, be used as a shrinkable sleeve in accordance with the present invention so that when heat is supplied, the embedded grid shrinks and the non-shrinkable component softens to such an extent that the shrinkage can take place.

Other variants of the invention are that the shrinkable component is embedded in the form of an open grid in a cross-linked, but unstretched, form which can, likewise, take place directly or as a laminate with other foils. In this way, firstly, a sleeve is formed which is not yet shrinkable, as it has not yet been provided with the shape memory, which is to be introduced by the step of stretching. However, this unstretched form of the sleeve can, as a whole, be subjected to stretching and, thus, provided with the shape memory. In other cases, this results in advantages in respect of layer thickness and mutual adhesion between the individual layers.

The adhesion between the individual layers of the sleeve is particularly intimate as overall only compatible materials are used which, in part, exhibit a certain radiation resistance so that the adhesiveness and mutual weldability is maintained. In this way, laminates in the form of a sandwich system consisting of a plurality of layers can be easily produced.

The design of the shrinkable component in the form of an open grid or reticle comprising a fixed, undetachable connection of the grid fiber elements at the individual intersection points of the grid or reticle cells insures a good mechanical stability, in particular with regard to tearing and tear growth in the case of mechanical damage to the sleeve, such as, for example, in the case of assembly by incorrect cutting. In conventional sleeves, grooves also lead, for example, to tearing or tear growths until it becomes unserviceable. In contrast, in the case of the sleeve in accordance with the present invention, such damages can only take place up to the next intersection as from there onward increased stability again exists causing the tearing to be stopped.

The shrinkability and the activatability of the shrinking forces can be varied in many different ways. Thus, it is possible to influence the shrinking forces by appropriate shaping and by stretching the grid structure. Another possibility consists of using a plurality of layers of the shrinkable grids, which are embedded either directly or in a laminate form together with other elements.

However, the invention is not limited to the use of shrinkable elements consisting of one of the conventional shrinking compounds. Thus, it is also possible for the shrinking components to consist of elastic elements, such as, for example, rubber-elastic grid. In the stretched state, an open grid of this kind is maintained in the state of stress in initially non-shrinkable laminate structure. When heat is supplied, the non-shrinkable material will soften and the "frozen-in" elastic forces causes the sleeve to shrink. Following cooling, stable conditions are re-established. Materials suitable for this purpose are, again, cross-linked polymers.

Other advantages and features will be readily apparent from the following description of the preferred embodiments, the drawings and claims.

DESCRIPTION OF THE PREFERRED EMBODIMENTS

Figure 1:
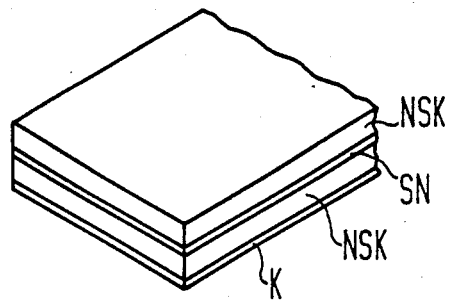
FIG. 1 is a perspective view of a fundamental layer construction of a sleeve in accordance with the present invention.
Figure 4:
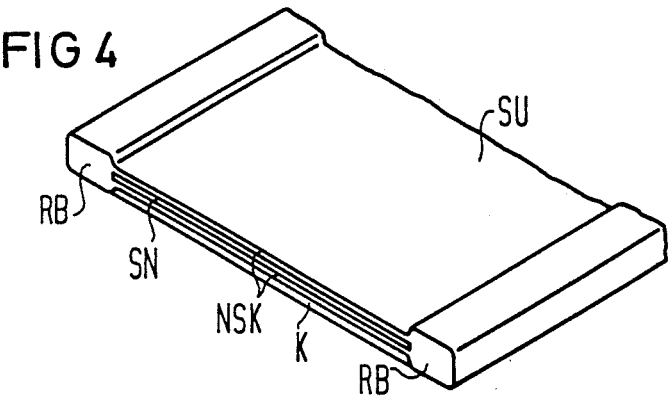
FIG. 4 is a perspective view of an unwrapped shrinkable sleeve with longitudinal sealing zones in accordance with the present invention.

The principles of the present invention are particularly useful when incorporated in a laminate structure for a shrinkable sleeve SU of FIG. 4, which sleeve is in a flat form before being wrapped around an object or rolled into a tubular shape. A shrinkable component SN (FIG. 1) is embedded between two non-shrinkable components NSK and the laminate includes an additional layer K, which may be a heat-meltable adhesive, which is applied on one side of one of the non-shrinkable components. When heat is applied up to the shrinking temperature of the heat-shrinkable component SN, the non-shrinkable components NSK soften without melting or even running so that the shrinkage forces of the shrinkable component SN can fully develop and the sleeve can shrink onto the encased object. The applied fusion adhesive K will melt and produce a seal between the sleeve and the encased object. After cooling, a seal connection will be established.

Figure 2:
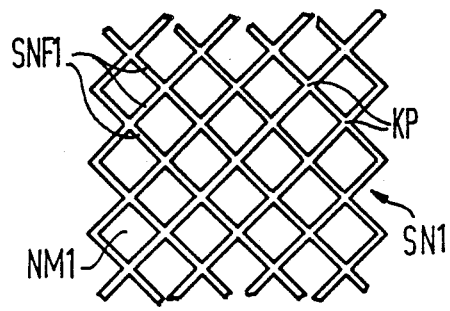
FIG. 2 is a plan view of a shrinkable component in the form of a lattice-shaped open grid.

As illustrated in FIG. 2, the shrinkable component SN is in the form of an open grid, which may be a rhomboid reticle. As already described, the individual fiber elements SNF1 can be considered as shrinkable elements which, depending on the exemplary embodiment, are embedded in the sleeve in a stretched or unstretched form. The fiber elements SNF1 are undetachably connected to one another at the juncture or intersection points KP so that a stable structure is formed. This causes the shrinkage forces of the individual fiber elements SNF1 to be uniformly distributed over the entire surface area. In this way, scarcely any tension occurs which would lead to unintentional deformation. The actual structure of the cells or openings NM1 is not important. They may be rectangular, curved or other similar basic shapes can be selected. The securing or fixing at the individual intersection points, such as KP, must be provided. A grid structure corresponding to FIG. 2 can be produced, for example, in a simple manner as a molded component in the form of a mat which, following the cross-linking, either immediately or together with the other layers, is stretched and, thus, forms the shrinkable component SN. On the basis of the simple construction for such a shrinkable structure, it is possible to cut out arbitrary components which then, together with other components, result in a shrinkage only in certain subzones or regions. This means that the sleeve can be produced which are shrinkable only in the matching zones, while the other zones are not influenced by the shrinkage. This design is not possible when utilizing loose fabrics.

Figure 3:
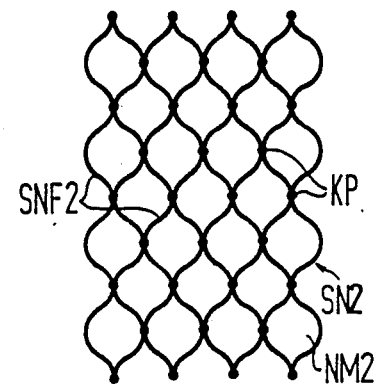
FIG. 3 is a plan view of the formation of an open grid in accordance with the present invention by individual grid fiber elements which are alternately undetachably joined together at intervals.

Another embodiment of the shrinkable component SN2 is illustrated in FIG. 3 in the form of a curved grid. Here, the grid consists of individual fiber elements or strands SNF2 which are, firstly, connected to one another while extending parallel to each other at progressive intervals, but in alternation. When the parallel structure has been expanded in a transverse direction to the strands, the lattice formation shown in FIG. 3 will be produced and the individual fiber elements SNF2, which are joined to one another and fixed at the intersecting points KP, for example by material welding. The open grid of this kind is particularly flexible and, depending upon the requirements, can be introduced more or less closely into the other layers. For example, in this way, the degree of shrinkage and the level of shrinkage forces with regard to the overall structure, can be varied within certain limits. Similar effects can also be achieved by means of multiple open grid layers as the shrinkage is intensified in these zones having more than one shrinkable grid.

The heat shrinkable sleeve SU, which is constructed from the above-described elements, is illustrated in FIG. 4. The described layers, the shrinkable component SN and the non-shrinkable components NSK are arranged in the center, which is the shrinkable zone of the shrinkable sleeve SU. In addition, an adhesive layer K is applied to a side of the sleeve which will later face inward. Edge zones RB along the longitudinal edges of the shrinkable sleeve SU consists of sealing elements or, at least, are prepared in such a manner that such elements can be inserted or secured thereto. However, these edge zones RB must be heat resistant at the shrinkable temperature, for example, at the temperature they must retain their shape. This can be achieved, for example, by strong cross-linking of these edge zones RB. Corresponding heat resistant linings are also suitable for this purpose. Furthermore, by means of longitudinal extension of such edge zones on the inside of the sleeve, a projection can be formed which, when the sleeve is closed, bridges the longitudinal gap and forms a seal. The edge zones RB can, for example, have a wedge-shaped construction, as in known sealing systems, so that they can be closed by a wedge-shaped rail or bar. However, the structure of the edge zones has no direct influence on the design of the shrinkable part of the sleeve in accordance with the present invention.

Although various minor modifications may be suggested by those versed in the art, it should be understood that I wish to embody within the scope of the patent granted hereon all such modifications as reasonably and properly come within the scope of my contribution to the art.

I claim:

1. In a heat-shrinkable sleeve comprising a shrinkable component arranged with a non-shrinkable component, the improvements comprising the shrinkable component consisting of a cross-linked polymer having a shrinking temperature, said shrinkable component being elements in the form of an open grid with intersecting points of the elements forming grid cells of the grid being undetachably connected to one another at each point of intersection, said grid being embedded in the non-shrinkable component and being in a stretched condition, said non-shrinkable component being of a material that is softened at said shrinking temperature without melting and running.

2. In a heat-shrinkable sleeve according to claim 1, wherein the open grid of the shrinkable component has rectangular grid cells.

3. In a heat-shrinkable sleeve according to claim 1. wherein the grid of the shrinkable component has rhomboid grid cells.

4. In a heat-shrinkable sleeve according to claim 1, wherein the open grid has circular grid cells.

5. In a heat-shrinkable sleeve according to claim 1, wherein the open grid is produced in the form of a molded mat component.

6. In a heat-shrinkable sleeve according to claim 1, wherein the open grid of the shrinkable component is formed by individual parallel extending fiber elements, said fiber elements being attached to one another at intervals along each other with the attachment of one fiber to an adjacent fiber having an alternate sequence with the attachment to the next adjacent fiber so that the connected fibers can be spread apart in a direction at right angles to the fibers to form said open grid.

7. In a heat-shrinkable sleeve according to claim 1, wherein the shrinkable component is embedded in a single foil forming the non-shrinkable component.

8. In a heat-shrinkable sleeve according to claim 1, wherein the shrinkable component is embedded between two planar foils forming the non-shrinkable component.

9. In a heat-shrinkable sleeve according to claim 1, wherein the sleeve includes an adhesive layer on one surface.

10. In a heat-shrinkable sleeve according to claim 1, wherein the sleeve along two parallel longitudinal edges has thermally stable edge zones which serve as sealing elements.

11. In a heat-shrinkable sleeve according to claim 1, wherein said sleeve is provided along two parallel longitudinal edges with thermally stable edge zones, and sealing elements can be inserted into said zones.

12. In a heat-shrinkable sleeve according to claim 1, wherein the material of the non-shrinkable component is a cross-linked polymer.

13. In a heat-shrinkable sleeve according to claim 1, wherein the material of the non-shrinkable component is a polymer free of cross-linking.

14. In a heat-shrinkable sleeve according to claim 1, wherein the shrinkable component consists of a synthetic compound containing polyether-ester-elastomer as a non-irradiation cross-linkable main component.

15. In a heat-shrinkable sleeve according to claim 14, wherein the shrinkable component contains ethylene-vinyl-acetate as an irradiation cross-linkable component.

16. In a heat-shrinkable sleeve according to claim 1, which further includes additional reinforcing fibers consisting of a thermal plastic material of a chemical structure similar to the main component with a crystallite melting point equal to or greater than 200° C., said fibers being selected from a group of materials consisting of polyethylene-terephthalate, polybutyleneterephthalate, polyamide 6, and poly-4-methylpentene 1.

17. In a heat-shrinkable sleeve according to claim 16, wherein the additional reinforcing fibers amount to 10–60 volume percent.

18. In a heat-shrinkable sleeve according to claim 1, wherein the sleeve is constructed in a sandwich structure with multi-layer laminations.

19. In a heat-shrinkable sleeve according to claim 1, which includes additional reinforcing fibers of a thermal plastic material with a chemical structure similar to the main component and with a crystallite melting point of equal to or greater than 200° C. incorporated into said components, said shrinkage temperature of the shrinkable component being in a range of 90°–150° C. and below the crystallite melting point for said reinforcing fibers.

20. In a heat-shrinkable sleeve according to claim 1, wherein a plurality of shrinkage components are arranged one above the other, at least in a sub-zone of said sleeve.

21. In a heat-shrinkable sleeve according to claim 1, wherein the shrinkage component consists of a permanently elastic rubber material which, while in a stretched state, is embedded in the non-shrinkable component.

22. In a heat-shrinkable sleeve according to claim 1, wherein the shrinkable component is arranged only in selected sub-zones of said sleeve.

23. A process for producing a heat-shrinkable sleeve having a shrinkable component shrinkable at a shrinking temperature and comprising an open grid embedded in a non-shrinkable component, said non-shrinkable component being of a material that is softened at said shrinking temperature without melting and running, said process comprising the steps of providing a shrinkable component in the form of an open grid, embedding the open grid in a non-stretched condition into the non-shrinkable component and, subsequently, stretching the grid and non-shrinkable component.

24. A process for producing a heat-shrinkable sleeve having a shrinkable component shrinkable at a shrinking temperature and in the form of an open grid embedded in a non-shrinkable component, said non-shrinkable component being of a material that is softened at said shrinking temperature without melting and running, said process comprising the steps of providing the shrinkable component as an open grid, stretching the open grid into a stretched configuration, and then embedding the stretched grid into the non-shrinkable component.

* * * * *